United States Patent
Xia et al.

(10) Patent No.: US 12,388,509 B2
(45) Date of Patent: *Aug. 12, 2025

(54) METHOD FOR SELECTING CYCLIC SHIFT DIVERSITY SEQUENCE, AND RELATED APPARATUS

(71) Applicant: HUAWEI TECHNOLOGIES CO., LTD., Guangdong (CN)

(72) Inventors: Kaifeng Xia, Shenzhen (CN); Ming Gan, Shenzhen (CN); Xin Zuo, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

This patent is subject to a terminal disclaimer.

(21) Appl. No.: 18/495,791

(22) Filed: Oct. 27, 2023

(65) Prior Publication Data
US 2024/0056157 A1    Feb. 15, 2024

Related U.S. Application Data

(63) Continuation of application No. 17/497,969, filed on Oct. 10, 2021, now Pat. No. 11,838,086, which is a (Continued)

(30) Foreign Application Priority Data

Apr. 11, 2019    (CN) .......................... 201910290009.3

(51) Int. Cl.
*H04B 7/06*    (2006.01)

(52) U.S. Cl.
CPC ......... *H04B 7/0684* (2013.01); *H04B 7/0667* (2013.01)

(58) Field of Classification Search
CPC ........................... H04B 7/0684; H04B 7/0667
See application file for complete search history.

(56) References Cited

U.S. PATENT DOCUMENTS

| | | |
|---|---|---|
| 9,876,614 B1 | 1/2018 | Sun et al. |
| 2011/0013547 A1 | 1/2011 | Liao et al. |
| | (Continued) | |

FOREIGN PATENT DOCUMENTS

| | | |
|---|---|---|
| CN | 102377468 A | 3/2012 |
| CN | 104641250 A | 5/2015 |
| | (Continued) | |

OTHER PUBLICATIONS

IEEE Std 802.11ac-2013, IEEE Standard for Information technology Telecommunications and information exchange between systems Local and metropolitan area networks Specific requirements, Part 11: Wireless LAN Medium Access Control (MAC) and Physical Layer (PHY) Specifications, Amendment 4: Enhancements for Very High Throughput for Operation in Bands below 6 GHz, IEEE Computer Society, Dec. 11, 2013, total 425 pages.

(Continued)

*Primary Examiner* — Janice N Tieu

(57) ABSTRACT

A method for selecting a cyclic shift diversity sequence, and a related apparatus are disclosed. The method includes: sending a frame by using a cyclic shift diversity (CSD) sequence, comprising: generating a frame, wherein the frame comprises a first data subframe conforming to a first communication mechanism and a third data subframe conforming to the first communication mechanism; sending the frame, wherein the first data subframe and the third data subframe are sent by using a cyclic shift diversity sequence. Under an EHT standard, a preferred cyclic shift diversity sequence can be obtained through selection from massive (Continued)

combinations of CSD values. Work efficiency is improved, and an operation burden is reduced.

18 Claims, 4 Drawing Sheets

Related U.S. Application Data continuation of application No. PCT/CN2020/084151, filed on Apr. 10, 2020.

(56) References Cited

U.S. PATENT DOCUMENTS

| | | | |
|---|---|---|---|
| 2011/0305194 | A1 | 12/2011 | Zheng et al. |
| 2012/0224570 | A1 | 9/2012 | Seok et al. |
| 2016/0255620 | A1 | 9/2016 | Li et al. |
| 2017/0048882 | A1 | 2/2017 | Li et al. |
| 2017/0126456 | A1 | 5/2017 | Lee et al. |
| 2017/0201944 | A1 | 7/2017 | Lin et al. |
| 2017/0201975 | A1 | 7/2017 | Yang et al. |
| 2021/0204299 | A1* | 7/2021 | Yun .................. H04W 72/542 |
| 2022/0029687 | A1 | 1/2022 | Xia et al. |
| 2022/0094394 | A1 | 3/2022 | Park et al. |

FOREIGN PATENT DOCUMENTS

| | | |
|---|---|---|
| JP | 2015122757 A | 7/2015 |
| JP | 2016510573 A | 4/2016 |
| JP | 2016154340 A | 8/2016 |

OTHER PUBLICATIONS

Office Action issued in JP2023-098027, dated Jul. 1, 2024, with English translation, 9 pages.

Hu Wu-jun et al, Modified SLM algorithm based on cyclic shift and signal combination in MIMO-OFDM system, Journal on Communications, vol. 36 No. 4, Apr. 2015, 8 pages.

IEEE Std 802.Nov. 2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

Yuichiro Hikosaka et al, Effects of Open-loop Transmit Diversity Schemes with Four Antennas on Control Signals Using Cyclic-Shift CDMA, 2012, 5 pages.

Jin-Hyuk Song et al , A Simple Cooperative qclic Delay Diversity in Wireless Networks, ATNAC 2008, 4 pages.

Doc.: IEEE 802.11-18/0413r0, Rui Cao et al, Discussion on WUR Multi-Antenna Transmission, Mar. 5, 2018, total 24 pages.

Extended European Search Report issued in EP20787186.4, dated Apr. 7, 2022, 13 pages.

Kristem, Vinod et al., PHY Comment resolution for Clause 31, IEEE 802.11-19/0398r1, IEEE, Internet URL: https://mentor.ieee.org/802.11/dcn/19/11-19-0398-01-00ba-phy-comment-resolution-for-clause-31.docx>, Mar. 11, 2019, 11 pages.

Office Action issued in JP2021-559878, dated Aug. 15, 2022, with English Translation, 7 pages.

* cited by examiner

IEEE 802.11n HT hybrid-mode frame

IEEE 802.11ac VHT frame

IEEE 802.11ax HE frame

METHOD FOR SELECTING CYCLIC SHIFT DIVERSITY SEQUENCE, AND RELATED APPARATUS

CROSS-REFERENCE TO RELATED APPLICATIONS

This application is a continuation of U.S. patent application Ser. No. 17/497,969, filed on Oct. 10, 2021, which is a continuation of International Application No. PCT/CN2020/084151, filed on Apr. 10, 2020, which claims priority to Chinese Patent Application No. 201910290009.3, filed on Apr. 11, 2019. All of the afore-mentioned patent applications are hereby incorporated by reference in their entireties.

TECHNICAL FIELD

This application relates to the communications field, and in particular, to a method for selecting a cyclic shift diversity sequence, and a related apparatus.

BACKGROUND

To significantly increase a service transmission rate of a wireless local area network (WLAN) system, in 2018, the institute of electrical and electronics engineers (IEEE) formed a new study group referred to as the extremely high throughput (EHT) study group, to discuss a new next-generation standard solution that uses a 6-gigahertz (GHz) frequency band. It is planned that, in the new solution, a frequency band between 1 GHz and 7.125 GHz is used, a maximum of 16 spatial data streams are used, a maximum bandwidth is 320 MHz, and multi-channel switching, aggregation, and the like are included. According to the EHT solution, a transmission rate of a communications device will be greatly improved.

All generations of mainstream Wi-Fi protocols are compatible with conventional stations. For example, an 802.11a frame structure in an earliest-generation mainstream Wi-Fi protocol starts with a preamble, including a legacy short training field (L-STF), a legacy long training field (L-LTF), and a legacy signal field (L-SIG). Subsequently, the 802.11a preamble is referred to as a legacy preamble. For a purpose of compatibility with conventional stations, in subsequent mainstream Wi-Fi protocols 802.11g, 802.11n, 802.11ac, and 802.11ax that is being finalized, frame structures all start with legacy preambles.

To avoid an unnecessary beamforming (BF) effect, a cyclic shift diversity (CSD) needs to be used for each of a legacy preamble and a frame structure part following the legacy preamble in a transmit frame on each antenna. A plurality of used cyclic shift diversitys are collectively referred to as a cyclic shift diversity sequence. To avoid the beamforming effect as far as possible, a cyclic shift diversity sequence as preferred as possible needs to be used.

Under an EHT standard, a communications device can support a maximum of 16 transmit antennas, and each transmit antenna needs to correspond to one CSD value. When there are 16 transmit antennas, a cyclic shift diversity sequence includes 16 CSD values; when there are 15 transmit antennas, a cyclic shift diversity sequence includes 15 CSD values; and so on. Therefore, under the EHT standard, a total quantity of cyclic shift diversity sequence groups that include cyclic shift diversity sequences is extremely large, and it is difficult to select a preferred cyclic shift diversity sequence from the cyclic shift diversity sequence groups whose total quantity is extremely large.

SUMMARY

Embodiments of this application provide a method for selecting a cyclic shift diversity sequence, and a related apparatus. Under an EHT standard, a preferred cyclic shift diversity sequence can be obtained through selection from massive combinations of CSD values. Work efficiency is improved, and an operation burden is reduced.

According to a first aspect, an embodiment of this application provides a method for selecting a cyclic shift diversity sequence, including: generating a first cyclic shift diversity sequence group based on a target transmit antenna quantity, where the first cyclic shift diversity sequence group includes at least one first cyclic shift diversity sequence, the first cyclic shift diversity sequence includes at least one cyclic shift diversity CSD, and a quantity of CSDs in the first cyclic shift diversity sequence is equal to the target transmit antenna quantity.

An apparatus for selecting a cyclic shift diversity sequence includes a transmit end and a receive end. The transmit end transmits a first data frame to which the first cyclic shift diversity sequence is applied. The receive end obtains a candidate cyclic shift diversity sequence group through selection based on a magnitude of a signal power difference between a first data subframe and second data subframe in the first data frame and a magnitude of a signal power difference between the first data subframe and a third data subframe in the first data frame, where the candidate cyclic shift diversity sequence group includes at least one first cyclic shift diversity sequence. The first data frame includes the first data subframe conforming to a first communication mechanism, the second data subframe conforming to a second communication mechanism, and the third data subframe conforming to the first communication mechanism, and the first cyclic shift diversity sequence in the first cyclic shift diversity sequence group is used for the first communication mechanism. The first data subframe corresponds to a legacy short training sequence L-STF, the second data subframe corresponds to an extremely high throughput short training sequence EHT-STF, and the third data subframe corresponds to a legacy long training sequence L-LTF, a legacy signal sequence L-SIG, a repeated legacy signal sequence RL-SIG, an extremely high throughput signal field A EHT-SIG-A, and an extremely high throughput signal field B EHT-SIG-B. The target transmit antenna quantity is 9, 10, 11, 12, 13, 14, 15, or 16.

According to this embodiment of this application, the apparatus for selecting a cyclic shift diversity sequence first generates the first cyclic shift diversity sequence group based on the target transmit antenna quantity, where the quantity of CSDs in the first cyclic shift diversity sequence in the first cyclic shift diversity sequence group is equal to the target transmit antenna quantity. In the apparatus for selecting a cyclic shift diversity sequence, the transmit end applies the first cyclic shift diversity sequence when transmitting the first data frame, and the receive end obtains the candidate cyclic shift diversity sequence group through selection based on the magnitude of the signal power difference between the first data subframe and second data subframe in the first data frame and the magnitude of the signal power difference between the first data subframe and third data subframe in the first data frame. Under an EHT standard, a preferred cyclic shift diversity sequence can be obtained through selection from massive combinations of CSD values. Work efficiency is improved, and an operation burden is reduced.

With reference to the first aspect, in an implementation of the first aspect, the generating a first cyclic shift diversity sequence group includes:

generating a first cyclic shift diversity sequence subgroup based on the target transmit antenna quantity, where a quantity of CSDs in the first cyclic shift diversity sequence subgroup is equal to the target transmit antenna quantity; and performing interpolation processing on a cyclic shift diversity sequence in the first cyclic shift diversity sequence subgroup to generate the first cyclic shift diversity sequence group.

With reference to the first aspect, in an implementation of the first aspect, after the generating a first cyclic shift diversity sequence group, the method further includes:

(1) obtaining the candidate cyclic shift diversity sequence group through selection based on the magnitude of the signal power difference between the first data subframe and second data subframe in the first data frame and the magnitude of the signal power difference between the first data subframe and third data subframe in the first data frame.

The candidate cyclic shift diversity sequence group includes at least one first cyclic shift diversity sequence. The first data frame includes the first data subframe conforming to the first communication mechanism, the second data subframe conforming to the second communication mechanism, and the third data subframe conforming to the first communication mechanism, and the first cyclic shift diversity sequence in the first cyclic shift diversity sequence group is used for the first communication mechanism.

Step (1) is repeatedly performed until a quantity of cyclic shift diversity sequences in the candidate cyclic shift diversity sequence group obtained through selection meets a preset condition. The preset condition may be that the quantity is less than or equal to 1, or may be that the quantity is any number, for example, 5 or 10. This is not limited herein.

According to this embodiment of this application, the apparatus for selecting a cyclic shift diversity sequence first generates the first cyclic shift diversity sequence subgroup based on the target transmit antenna quantity, and performs interpolation processing on the cyclic shift diversity sequence in the first cyclic shift diversity sequence subgroup to obtain the first cyclic shift diversity sequence, where at least one first cyclic shift diversity sequence constitutes the first cyclic shift diversity sequence group. After obtaining the cyclic shift diversity sequence group through interpolation processing, the apparatus for selecting a cyclic shift diversity sequence obtains a candidate cyclic shift diversity sequence through selection from the cyclic shift diversity sequence group. The selection step may be repeatedly performed, and selection is stopped when the quantity of cyclic shift diversity sequences in the candidate cyclic shift diversity sequence group obtained through selection meets the preset condition. In this way, the cyclic shift diversity sequence obtained through selection is more preferred.

With reference to the first aspect, in an implementation of the first aspect, the obtaining a candidate cyclic shift diversity sequence group through selection based on a magnitude of a signal power difference between a first data subframe and second data subframe in the first data frame and a magnitude of a signal power difference between the first data subframe and a third data subframe in the first data frame includes:

generating a first signal power difference group based on the signal power difference between the first data subframe and third data subframe in the first data frame, where the first signal power difference group includes at least one first signal power difference;

calculating whether a difference between the first signal power difference and a first signal power difference whose value is the smallest in the first signal power difference group is less than or equal to a first threshold, where the first threshold may be 0.1;

if yes, arranging, in ascending order, the signal power difference between the first data subframe and second data subframe in the first data frame, to generate a second signal power difference group, where the second signal power difference group includes at least one second signal power difference; and selecting, from the second signal power difference group, a second signal power difference arranged within the first second threshold range, to obtain a third signal power difference group through selection, where all cyclic shift diversity sequences in the third signal power difference group constitute the candidate cyclic shift diversity sequence group, and the second threshold range may be ⅓.

This embodiment of this application provides a specific method for selecting a cyclic shift diversity sequence, thereby improving feasibility of this solution.

With reference to the first aspect, in an implementation of the first aspect, the calculating whether a difference between the first signal power difference and a first signal power difference whose value is the smallest in the first signal power difference group is less than or equal to a first threshold includes:

determining, in the following manner, whether the difference is less than the first threshold:

$$D1_b - D1(\min)_b \leq Y1.$$

$D1_b$ represents the first signal power difference in the first signal power difference group, $D1(\min)_b$ represents the first signal power difference whose value is the smallest in the first signal power difference group, b represents transmission bandwidth of the first data frame, and Y1 represents the first threshold.

This embodiment of this application provides a specific method for calculating whether the difference between the first signal power difference and the first signal power difference whose value is the smallest in the first signal power difference group is less than or equal to the first threshold, thereby improving feasibility of this solution.

With reference to the first aspect, in an implementation of the first aspect, the selecting a second signal power difference arranged within the first second threshold range, to obtain a third signal power difference group through selection includes:

obtaining the third signal power difference group through selection in the following manner:

$$\text{rank}(D2)_b \leq Y2^*(N2), \text{ where}$$

D2 represents the second signal power difference, b represents transmission bandwidth of the first data frame, Y2 represents the second threshold range, and N2 is the second signal power difference group.

This embodiment of this application provides a specific method for selecting the second signal power difference arranged within the first second threshold range, thereby improving feasibility of this solution.

With reference to the first aspect, in an implementation of the first aspect, the target transmit antenna quantity is 9, and the cyclic shift diversity sequence is [0, −187.5, −12.5, −175, −25, −162.5, −75, −112.5, −200];

the target transmit antenna quantity is 10, and the cyclic shift diversity sequence is [0, −187.5, −12.5, −175, −25, −162.5, −37.5, −112.5, −75, −200];

the target transmit antenna quantity is 11, and the cyclic shift diversity sequence is [0, −187.5, −12.5, −175, −25, −162.5, −50, −137.5, −87.5, −112.5, −200];

the target transmit antenna quantity is 12, and the cyclic shift diversity sequence is [0, −187.5, −12.5, −175, −37.5, −150, −50, −125, −75, −112.5, −100, −200];

the target transmit antenna quantity is 13, and the cyclic shift diversity sequence is [0, −187.5, −12.5, −175, −37.5, −162.5, −50, −137.5, −62.5, −125, −87.5, −112.5, −200];

the target transmit antenna quantity is 14, and the cyclic shift diversity sequence is [0, −187.5, −12.5, −175, −25, −150, −37.5, −137.5, −50, −125, −62.5, −112.5, −87.5, −200];

the target transmit antenna quantity is 15, and the cyclic shift diversity sequence is [0, −187.5, −12.5, −175, −25, −162.5, −50, −150, −62.5, −112.5, −75, −125, −87.5, −100, −200]; or the target transmit antenna quantity is 16, and the cyclic shift diversity sequence is [0, −187.5, −12.5, −175, −25, −162.5, −37.5, −150, −50, −137.5, −62.5, −125, −75, −100, −87.5, −200].

According to a second aspect, an embodiment of this application provides an apparatus for selecting a cyclic shift diversity sequence. The apparatus has a function of implementing each behavior in the first aspect. The function may be implemented by hardware, or may be implemented by executing corresponding software by hardware. The hardware or software includes one or more modules corresponding to the foregoing function.

With reference to the second aspect, in an implementation of the second aspect, the apparatus includes a unit or module configured to perform each step in the first aspect. For example, the apparatus includes:

a generation module, configured to generate a first cyclic shift diversity sequence group based on a target transmit antenna quantity, where the first cyclic shift diversity sequence group includes at least one first cyclic shift diversity sequence, the first cyclic shift diversity sequence includes at least one cyclic shift diversity CSD, and a quantity of CSDs in the first cyclic shift diversity sequence is equal to the target transmit antenna quantity; and a selection module, configured to obtain a candidate cyclic shift diversity sequence group through selection based on a magnitude of a signal power difference between a first data subframe and second data subframe in a first data frame and a magnitude of a signal power difference between the first data subframe and a third data subframe in the first data frame, where the candidate cyclic shift diversity sequence group includes at least one first cyclic shift diversity sequence, the first data frame includes the first data subframe conforming to a first communication mechanism, the second data subframe conforming to a second communication mechanism, and the third data subframe conforming to the first communication mechanism, and the first cyclic shift diversity sequence in the first cyclic shift diversity sequence group is used for the first communication mechanism.

With reference to the second aspect, in an implementation of the second aspect, the generation module is further configured to generate a first cyclic shift diversity sequence subgroup based on the target transmit antenna quantity, where a quantity of CSDs in the first cyclic shift diversity sequence subgroup is equal to the target transmit antenna quantity; and the generation module is further configured to perform interpolation processing on a cyclic shift diversity sequence in the first cyclic shift diversity sequence subgroup to generate the first cyclic shift diversity sequence group.

With reference to the second aspect, in an implementation of the second aspect, (1) the selection module is further configured to obtain the candidate cyclic shift diversity sequence group through selection based on the magnitude of the signal power difference between the first data subframe and second data subframe in the first data frame and the magnitude of the signal power difference between the first data subframe and third data subframe in the first data frame, where the candidate cyclic shift diversity sequence group includes at least one first cyclic shift diversity sequence, the first data frame includes the first data subframe conforming to the first communication mechanism, the second data subframe conforming to the second communication mechanism, and the third data subframe conforming to the first communication mechanism, and the first cyclic shift diversity sequence in the first cyclic shift diversity sequence group is used for the first communication mechanism.

Step (1) is repeatedly performed until a quantity of cyclic shift diversity sequences in the candidate cyclic shift diversity sequence group obtained through selection meets a preset condition.

With reference to the second aspect, in an implementation of the second aspect, the generation module is specifically configured to generate a first signal power difference group based on the signal power difference between the first data subframe and third data subframe in the first data frame, where the first signal power difference group includes at least one first signal power difference.

A calculation module is configured to calculate whether a difference between the first signal power difference and a first signal power difference whose value is the smallest in the first signal power difference group is less than or equal to a first threshold.

If yes, the generation module is specifically configured to arrange, in ascending order, the signal power difference between the first data subframe and second data subframe in the first data frame, to generate a second signal power difference group, where the second signal power difference group includes at least one second signal power difference.

The selection module is specifically configured to select, from the second signal power difference group, a second signal power difference arranged within the first second threshold range, to obtain a third signal power difference group through selection, where all cyclic shift diversity sequences in the third signal power difference group constitute the candidate cyclic shift diversity sequence group.

With reference to the second aspect, in an implementation of the second aspect, the first threshold is 0.1, and the second threshold is ⅓.

With reference to the second aspect, in an implementation of the second aspect, the calculating whether a difference between the first signal power difference and a first signal power difference whose value is the smallest in the first signal power difference group is less than or equal to a first threshold includes:

determining, in the following manner, whether the difference is less than the first threshold:

$$D1_b - D1(min)_b \leq Y1$$

$D1_b$ represents the first signal power difference in the first signal power difference group, $D1(min)_b$ represents the first signal power difference whose value is the smallest in the first signal power difference group, b represents transmission bandwidth of the first data frame, and Y1 represents the first threshold.

With reference to the second aspect, in an implementation of the second aspect, the transmission bandwidth of the first data frame is 20 megahertz, 40 megahertz, or 80 megahertz.

With reference to the second aspect, in an implementation of the second aspect, the selecting a second signal power difference arranged within the first second threshold range, to obtain a third signal power difference group through selection includes:

obtaining the third signal power difference group through selection in the following manner:

$$\text{rank}(D2)_b \leq Y2^*(N2).$$

D2 represents the second signal power difference, b represents transmission bandwidth of the first data frame, Y2 represents the second threshold range, and N2 is the second signal power difference group.

With reference to the second aspect, in an implementation of the second aspect, the first data subframe corresponds to a legacy short training sequence L-STF, the second data subframe corresponds to an extremely high throughput short training sequence EHT-STF, and the third data subframe corresponds to a legacy long training sequence L-LTF, a legacy signal sequence L-SIG, a repeated legacy signal sequence RL-SIG, an extremely high throughput signal field A EHT-SIG-A, and an extremely high throughput signal field B EHT-SIG-B.

With reference to the second aspect, in an implementation of the second aspect, the CSD is an integral multiple of a first time period, the first time period is 12.5 nanoseconds or 25 nanoseconds, and a value of the CSD is within a range from 0 nanoseconds to 200 nanoseconds.

With reference to the second aspect, in an implementation of the second aspect, the target transmit antenna quantity is 9, 10, 11, 12, 13, 14, 15, or 16.

With reference to the second aspect, in an implementation of the second aspect, the target transmit antenna quantity is 9, and the cyclic shift diversity sequence is [0, −187.5, −12.5, −175, −25, −162.5, −75, −112.5, −200];
the target transmit antenna quantity is 10, and the cyclic shift diversity sequence is [0, −187.5, −12.5, −175, −25, −162.5, −37.5, −112.5, −75, −200];
the target transmit antenna quantity is 11, and the cyclic shift diversity sequence is [0, −187.5, −12.5, −175, −25, −162.5, −50, −137.5, −87.5, −112.5, −200];
the target transmit antenna quantity is 12, and the cyclic shift diversity sequence is [0, −187.5, −12.5, −175, −37.5, −150, −50, −125, −75, −112.5, −100, −200];
the target transmit antenna quantity is 13, and the cyclic shift diversity sequence is [0, −187.5, −12.5, −175, −37.5, −162.5, −50, −137.5, −62.5, −125, −87.5, −112.5, −200];
the target transmit antenna quantity is 14, and the cyclic shift diversity sequence is [0, −187.5, −12.5, −175, −25, −150, −37.5, −137.5, −50, −125, −62.5, −112.5, −87.5, −200];
the target transmit antenna quantity is 15, and the cyclic shift diversity sequence is [0, −187.5, −12.5, −175, −25, −162.5, −50, −150, −62.5, −112.5, −75, −125, −87.5, −100, −200]; or
the target transmit antenna quantity is 16, and the cyclic shift diversity sequence is [0, −187.5, −12.5, −175, −25, −162.5, −37.5, −150, −50, −137.5, −62.5, −125, −75, −100, −87.5, −200].

According to a third aspect, an embodiment of this application provides a computer-readable storage medium. The computer-readable storage medium stores instructions. When the instructions are run on a computer, the computer is enabled to perform the method according to the first aspect.

According to a fourth aspect, an embodiment of this application provides a computer program product including instructions. When the computer program product is run on a computer, the computer is enabled to perform the method according to the first aspect.

According to a fifth aspect, an embodiment of this application provides a communications device. The communications device may be an entity such as a terminal device or a network device. The communications device includes a processor and a memory. The memory is configured to store instructions. The processor is configured to execute the instructions in the memory, so that the communications device performs any method according to the first aspect or the second aspect.

According to a sixth aspect, this application provides a chip system. The chip system includes a processor, configured to support a communications device in implementing a function in the foregoing aspects, for example, sending or processing data and/or information in the foregoing methods. In a possible design, the chip system further includes a memory, and the memory is configured to store program instructions and data that are necessary for the communications device. The chip system may include a chip, or may include a chip and another discrete device.

It can be learned from the foregoing technical solutions that the embodiments of this application have the following advantages:

Under the EHT standard, a preferred cyclic shift diversity sequence can be obtained through selection from massive combinations of CSD values. Work efficiency is improved, and an operation burden is reduced.

DESCRIPTION OF EMBODIMENTS

Embodiments of this application provide a method for selecting a cyclic shift diversity sequence. Under an EHT standard, a preferred cyclic shift diversity sequence can be obtained through selection from massive combinations of CSD values. Work efficiency is improved, and an operation burden is reduced.

Before the embodiments are described, several concepts that may appear in the embodiments are first described. It should be understood that, the following concept interpretation may be limited due to specific cases of the embodiments, but this does not mean that this application is limited to only the specific cases. The following concept interpretation may also vary with specific cases of different embodiments.

Figure 1:
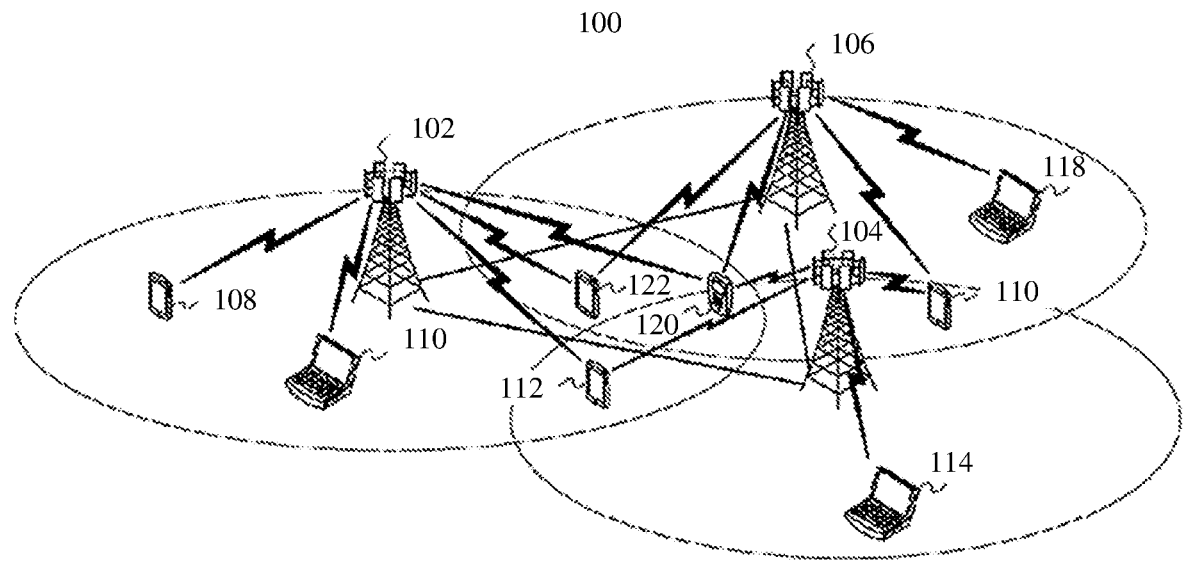
FIG. 1 is a schematic diagram of a topology of a wireless communications network according to an embodiment of this application.

FIG. 1 is a schematic diagram of a topology of a wireless communications network according to an embodiment of this application. As shown in FIG. 1, the wireless communications network 100 includes network devices 102 to 106 and terminal devices 108 to 122. The network devices 102 to 106 may communicate with each other by using backhaul links (as shown by straight lines between the network devices 102 to 106). The backhaul link may be a wired backhaul link (for example, an optical fiber or a copper cable), or may be a wireless backhaul link (for example, a microwave). The terminal devices 108 to 122 may communicate with the corresponding network devices 102 to 106 by using wireless links (as shown by broken lines between the network devices 102 to 106 and the terminal devices 108 to 122). The network devices 102 to 106 may also be referred to as base stations.

The network devices 102 to 106 usually serve as access devices to provide wireless access services for the terminal devices 108 to 122 that usually serve as user equipments. Specifically, each network device corresponds to a service coverage area (which may also be referred to as a cell, as shown by each elliptical area in FIG. 1). A terminal device that enters the area may communicate with the network device by using a radio signal, to receive a wireless access service provided by the network device. Service coverage areas of the network devices may overlap. A terminal device located in an overlapping area can receive radio signals from a plurality of network devices, and therefore, these network devices can collaborate with each other to provide a service for the terminal device. For example, the plurality of network devices may use a coordinated multipoint (CoMP) technology to provide the service for the terminal device located in the overlapping area. For example, as shown in FIG. 1, a service coverage area of the network device 102 overlaps with that of the network device 104, and the terminal device 112 is located in an overlapping area thereof. Therefore, the terminal device 112 can receive radio signals from the network device 102 and the network device 104, and the network device 102 and the network device 104 can collaborate with each other to provide a service for the terminal device 112. For another example, as shown in FIG. 1, there is a common overlapping area between service coverage areas of the network device 102, the network device 104, and the network device 106, and the terminal device 120 is located in the overlapping area. Therefore, the terminal device 120 can receive radio signals from the network devices 102, 104, and 106, and the network devices 102, 104, and 106 can collaborate with each other to provide a service for the terminal device 120.

Depending on a used wireless communications technology, a network device may also be referred to as a NodeB, an evolved NodeB (eNodeB), an access point (access point, AP), or the like. In addition, based on sizes of provided service coverage areas, network devices may be further classified into a macro network device configured to provide a macro cell (macro cell), a micro network device configured to provide a micro cell, a femto network device configured to provide a femto cell, and the like. With continuous evolution of wireless communications technologies, a future network device may also use another name.

The terminal devices 108 to 122 may be various wireless communications devices with a wireless communication function, for example but not limited to, a mobile cellular phone, a cordless phone, a personal digital assistant (PDA), a smartphone, a notebook computer, a tablet computer, a wireless data card, a wireless modem (Modem), or a wearable device such as a smartwatch. With the rise of internet of things (IoT) technologies and internet of vehicles (IoV) technologies, a growing quantity of devices that previously have no communication function, for example but not limited to, a household appliance, a vehicle, a tool device, a service device, and a service facility, begin to obtain a wireless communication function by configuring a wireless communications unit, to access a wireless communications network and receive remote control. Such a device has a wireless communication function because the device is configured with a wireless communications unit, and therefore also belongs to a scope of wireless communications devices. In addition, the terminal devices 108 to 122 may also be referred to as mobile stations, mobile devices, mobile terminals, wireless terminals, handheld devices, clients, or the like.

Each of the network devices 102 to 106 and the terminal devices 108 to 122 may be configured with a plurality of antennas, to support a multiple input multiple output (MIMO) technology. Further, the network devices 102 to 106 and the terminal devices 108 to 122 may support a single-user MIMO (SU-MIMO) technology, and may also support multi-user MIMO (MU-MIMO). MU-MIMO may be implemented based on a space division multiple access (SDMA) technology. Because a plurality of antennas are configured, each of the network devices 102 to 106 and the terminal devices 108 to 122 may further flexibly support a single-input single-output (SISO) technology, a single-input multiple-output (SIMO) technology, and a multiple-input single-output (MISO) technology, to implement various diversity (for example but not limited to, transmit diversity and receive diversity) and multiplexing technologies. The diversity technologies may include, for example but not limited to, a transmit diversity (TD) technology and a receive diversity (RD) technology. The multiplexing technology may be a spatial multiplexing technology. Moreover, the foregoing various technologies may further include a plurality of implementation solutions. For example, the transmit diversity technology may include, for example but not limited to, diversity manners such as space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and diversity manners obtained through derivation, evolution, and combination of the foregoing various diversity manners. For example, transmit diversity manners such as space time block coding (STBC), space frequency block coding (SFBC), and CDD are used in a current long term evolution (LTE) standard. The foregoing summarily describes transmit diversity by using examples. A person skilled in the art should understand that, in addition to the foregoing examples, transmit diversity further includes a plurality of other implementations. Therefore, the foregoing descriptions shall not be understood as a limitation on the technical solutions of the present invention, and the technical solutions of the present invention shall be understood as being applicable to various possible transmit diversity solutions.

In addition, the network devices 102 to 106 and the terminal devices 108 to 122 may communicate by using various wireless communications technologies, for example but not limited to, a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (single carrier fdma, SC-FDMA) technology, a space division multiple access (SDMA) technology, and technologies evolved and derived from these technologies. As radio access technologies (RAT), the foregoing wireless communications technologies are adopted in numerous wireless communications standards, thereby constructing various widely known wireless communications systems (or networks), including but not limited to a Wi-Fi system, a worldwide interoperability for microwave access (WiMAX) system, a long term evolution (LTE) system, and an LTE advanced (LTE-A) system that are defined in the 802.11 family of standards, and systems evolved from these wireless communications systems, for example, a 5G new radio (5G NR) system. Unless otherwise specified, the technical solutions provided in the embodiments of the present invention may be applied to the foregoing various wireless communications technologies and wireless communications systems. In addition, the terms "system" and "network" may be interchanged.

It should be noted that the wireless communications network 100 shown in FIG. 1 is merely used as an example, and is not intended to limit the technical solutions of the present invention. A person skilled in the art should understand that, in a specific implementation process, the wireless communications network 100 may further include another device, and quantities of network devices and terminal devices may be alternatively configured based on a specific requirement.

Figure 2:
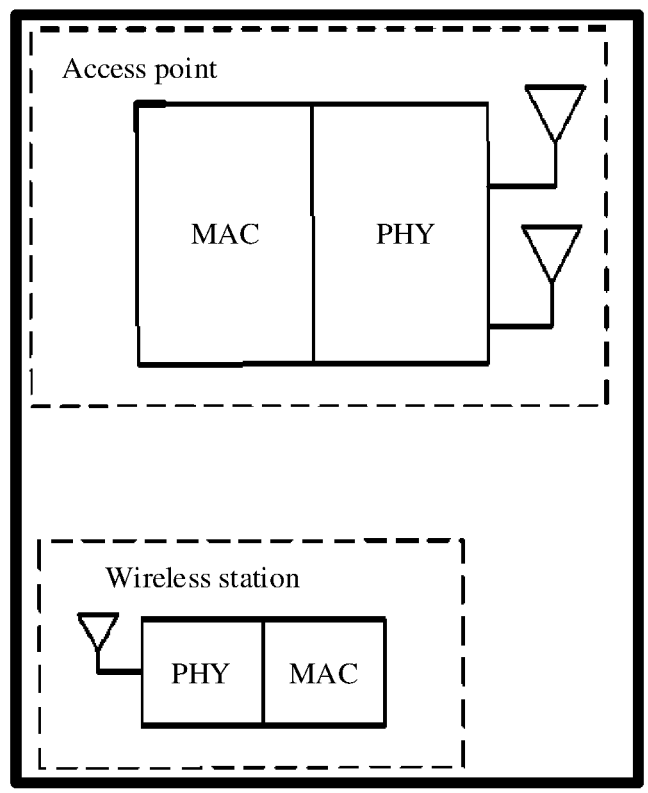
FIG. 2 is a schematic structural diagram of a wireless communications device according to an embodiment of this application.

In the wireless communications network 100 shown in FIG. 1, each of the network devices 102 to 106 and the terminal devices 108 to 122 may be considered as an access point (AP), and a plurality of network devices or a plurality of terminal devices may be considered as a wireless station (STA). The AP and the STA may be collectively referred to as wireless communications devices. Internal structures of an AP and a STA are shown in FIG. 2. FIG. 2 is a schematic structural diagram of a wireless communications device according to an embodiment of this application. This embodiment of this application focuses mainly on a media access control (MAC) layer and physical layer (PHY) of the wireless communications device. The wireless communications device is a device that supports the 802.11 family of standards. In FIG. 2, related data of the wireless communications device is processed by the MAC layer and the PHY, the AP supports two transmit antennas, and the STA supports one transmit antenna. It should be noted that, in actual application, each of the AP and the STA may support a plurality of transmit antennas. This is not limited herein. For example, in the embodiments of this application, a quantity of transmit antennas supported by a wireless communications device ranges from 9 to 16. It may be understood that, in the embodiments of this application, a quantity of transmit antennas supported by a wireless communications device may be greater than 16 or less than 9. This is not limited herein.

The following describes an extremely high throughput (EHT) standard in the 802.11 standards. The 802.11 standards define a MAC layer and a PHY layer. The 802.11 standards are used in wireless fidelity (WIFI) protocols. Therefore, the Wi-Fi protocols usually refer to the 802.11 standards. All generations of mainstream Wi-Fi protocols are compatible with conventional stations. For example, an 802.11a frame structure in an earliest-generation mainstream Wi-Fi protocol starts with a preamble, including a legacy short training field (L-STF), a legacy long training field (L-LTF), and a legacy signal field (L-SIG). Subsequently, the 802.11a preamble is referred to as a legacy preamble. For a purpose of compatibility with conventional stations, in subsequent mainstream Wi-Fi protocols 802.11g, 802.11n, 802.11ac, and 802.11ax that is being finalized, frame structures all start with legacy preambles.

To avoid an unnecessary beamforming (BF) effect, a cyclic shift diversity (CSD) needs to be used for each of a legacy preamble and a frame structure part following the legacy preamble in a transmit frame on each antenna. A plurality of used cyclic shift diversitys are collectively referred to as a cyclic shift diversity sequence. To avoid the beamforming effect as far as possible, a cyclic shift diversity sequence as preferred as possible needs to be used.

Figure 3A:
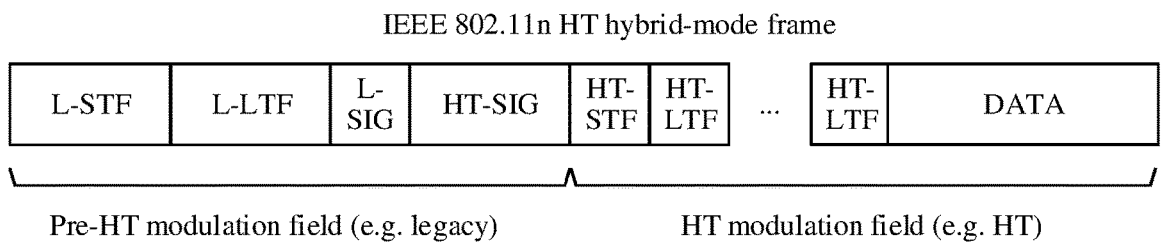
FIG. 3a is a schematic structural diagram of an 802.11n data frame according to an embodiment of this application.

In the 802.11n protocol, a structure of a PHY protocol data unit (PPDU) frame in a high throughput (HT) hybrid mode is shown in FIG. 3a. The PPDU frame is referred to as a data frame in this embodiment of this application. FIG. 3a is a schematic structural diagram of an 802.11n data frame according to an embodiment of this application. In the 802.11n protocol, a data frame structure may be divided into two parts based on different modulation modes and CSDs that are used. One part is a part in which a per-antenna CSD is used for a purpose of compatibility with a legacy frame, and this part is referred to as a pre-HT field, including a legacy preamble (an L-STF, an L-LTF a legacy signal field (L-SIG)), and a high throughput signal field (HT-SIG). For a CSD used in this part, different CSDs are used for different transmit antennas. The other part is a part in which HT modulation is used for a frame structure and a per-stream CSD is used, and this part is referred to as an HT field, including a high throughput short training field (HT-STF), a high throughput long training field (HT-LTF), and a data field. For a CSD used in this part, different CSDs are used for different data streams. For the pre-HT part in 802.11n, CSDs used for all antennas in different antenna configurations are shown in Table 1, and a delay time of each transmit link is within a range of [−200 ns, 0 ns]. A maximum transmit antenna quantity supported in 802.11n is 4.

TABLE 1

| Transmit antenna quantity | Shift value (ns) on each antenna $i_{TX}$ | | | |
|---|---|---|---|---|
| ($N_{TX}$) | 1 | 2 | 3 | 4 |
| 1 | 0 | — | — | — |
| 2 | 0 | −200 | — | — |

TABLE 1-continued

| Transmit antenna quantity | Shift value (ns) on each antenna $i_{TX}$ | | | |
|---|---|---|---|---|
| ($N_{TX}$) | 1 | 2 | 3 | 4 |
| 3 | 0 | −100 | −200 | — |
| 4 | 0 | −50 | −100 | −150 |

Figure 3B:
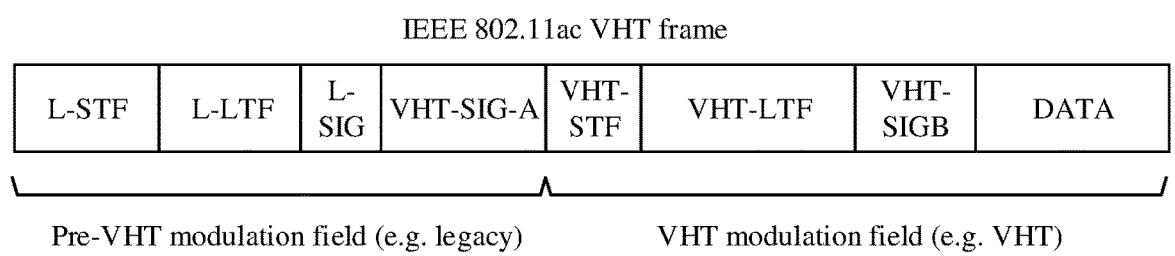
FIG. 3b is a schematic structural diagram of an 802.11ac data frame according to an embodiment of this application.

In the 802.11ac protocol, a data frame structure in a very high throughput (VHT) mode is shown in FIG. 3b. FIG. 3b is a schematic structural diagram of an 802.11ac data frame according to an embodiment of this application. Similar to that in 802.11n, such a data frame structure may also be divided into two parts. One part is a part in which a per-antenna CSD is used for a purpose of compatibility with a legacy frame structure, and this part is referred to as a pre-VHT field, including a legacy preamble (an L-STF and an L-LTF), a legacy signal field (L-SIG), and a very high throughput signal field A (VHT-SIG-A). The other part is a part in which VHT modulation is used for a frame structure and a per-stream CSD is used, and this part is referred to as a VHT field, including a very high throughput short training field (VHT-STF), a very high throughput long training field (VHT-LTF), a very high throughput signal field B (VHT-SIG-B), and a data field. For the pre-VHT part in 802.11ac, cyclic shift diversitys used for all antennas in different antenna configurations are shown in Table 2, and a delay time of each transmit link is still within the range of [−200 ns, 0 ns]. For antenna configurations with one stream to four streams, 802.11ac still uses the CSD values in 802.11n, indicating compatibility with previous transmission modes. A maximum transmit antenna quantity supported in the 802.11ac protocol is 8.

TABLE 2

| Transmit antenna | Shift value (ns) on each antenna $i_{TX}$ | | | | | | | |
|---|---|---|---|---|---|---|---|---|
| quantity ($N_{TX}$) | 1 | 2 | 3 | 4 | 5 | 6 | 7 | 8 |
| 1 | 0 | — | — | — | — | — | — | — |
| 2 | 0 | −200 | — | — | — | — | — | — |
| 3 | 0 | −100 | −200 | — | — | — | — | — |
| 4 | 0 | −50 | −100 | −150 | — | — | — | — |
| 5 | 0 | −175 | −25 | −50 | −75 | — | — | — |
| 6 | 0 | −200 | −25 | −150 | −175 | −125 | — | — |
| 7 | 0 | −200 | −150 | −25 | −175 | −75 | −50 | — |
| 8 | 0 | −175 | −150 | −125 | −25 | −100 | −50 | −200 |

Figure 3C:
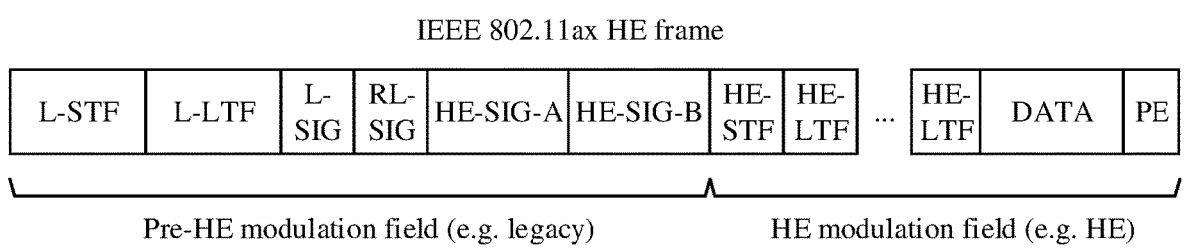
FIG. 3c is a schematic structural diagram of an 802.11ax data frame according to an embodiment of this application.

In the 802.11ax protocol, a data frame structure in a high efficiency (HE) mode is shown in FIG. 3c. FIG. 3c is a schematic structural diagram of an 802.11ax data frame according to an embodiment of this application. In the 802.11ax protocol, a supported maximum transmit antenna quantity is still 8, but a data frame structure and a manner of using a CSD are different from those in 802.11ac. For 802.11ax, when a parameter BEAM_CHANGE in a TX vector (TXVECTOR) is 1 or unknown, a legacy preamble (an L-STF and an L-LTF), a legacy signal field (L-SIG), a repeated legacy signal field (repeated legacy signal field, RL-SIG), a high efficiency signal field A (high efficiency signal field a, HE-SIG-A), and a high efficiency signal field B (HE-SIG-B) in a data frame use the same CSD as the pre-VHT field in 802.11ac, and this segment is referred to as a pre-HE field. In addition, a high efficiency short training field (HE-STF), a high efficiency long training field (HE-LTF), and a data (data) field use the same CSD as the VHT part in 802.11ac, and this segment is referred to as an HE field. When BEAM_CHANGE is 0, the entire 802.11ax frame uses the same CSD as the VHT field in 802.11ac.

Under an EHT standard, a communications device can support a maximum of 16 transmit antennas, and each transmit antenna needs to correspond to one CSD value. When there are 16 transmit antennas, a cyclic shift diversity sequence includes 16 CSD values; when there are 15 transmit antennas, a cyclic shift diversity sequence includes 15 CSD values; and so on. Therefore, under the EHT standard, a total quantity of cyclic shift diversity sequence groups that include cyclic shift diversity sequences is extremely large, and it is difficult to select a preferred cyclic shift diversity sequence from the cyclic shift diversity sequence groups whose total quantity is extremely large.

Based on the foregoing problem, the embodiments of this application propose a solution for selecting a preferred cyclic shift diversity sequence from massive cyclic shift diversity sequence groups.

Figure 4:
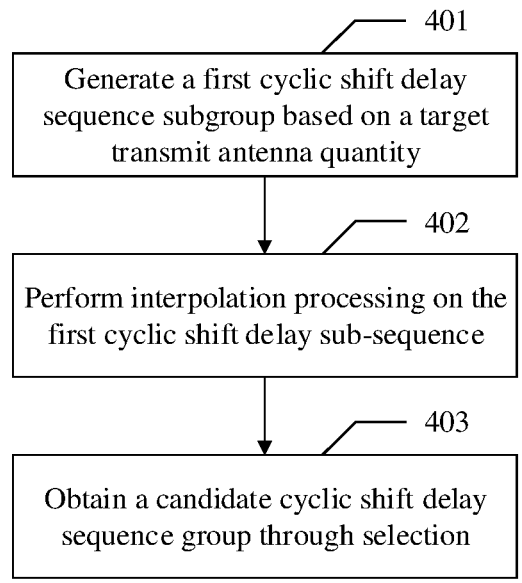
FIG. 4 is a schematic diagram of an embodiment of a method for selecting a cyclic shift diversity sequence according to an embodiment of this application.

The following describes the embodiments of this application with reference to the accompanying drawings. FIG. 4 is a schematic diagram of an embodiment of a method for selecting a cyclic shift diversity sequence according to an embodiment of this application. The method, for selecting a cyclic shift diversity sequence, provided in this embodiment of this application includes the following steps.

401: Generate a first cyclic shift diversity sequence subgroup based on a target transmit antenna quantity.

In this embodiment, an apparatus for selecting a cyclic shift diversity sequence generates the first cyclic shift diversity sequence subgroup based on the target transmit antenna quantity, where a quantity of CSDs in the first cyclic shift diversity sequence subgroup is equal to the target transmit antenna quantity.

For example, when the target antenna quantity is 16, a total quantity of CSDs in a cyclic shift diversity sequence in the first cyclic shift diversity sequence subgroup is 16. When the target antenna quantity is 15, a total quantity of CSDs in a cyclic shift diversity sequence in the first cyclic shift diversity sequence subgroup is 15.

Specifically, the first cyclic shift diversity sequence subgroup is generated by using the following method:

$$N(1) = C_{Z-1}^{X-1}.$$

N(1) is a total quantity of cyclic shift diversity sequences in the first cyclic shift diversity sequence subgroup, X is a current target transmit antenna quantity, and Z is a total quantity of selectable CSDs. An EHT standard is a continuation of 802.11ax. Therefore, a CSD value range is within an interval [−200 ns, 0 ns], and each CSD is an integral multiple of a first time period. When the first time period is 12.5 nanoseconds, a total quantity of unrepeated selectable CSDs is 17.

The EHT standard needs to be forward compatible. Therefore, in the cyclic shift diversity sequence in the first cyclic shift diversity sequence subgroup, the first CSD is determined as 0 ns, and the CSDs in the first cyclic shift diversity sub-sequence are arranged in descending order. The quantity of the CSDs in the cyclic shift diversity sequence in the first cyclic shift diversity sequence subgroup is equal to the target transmit antenna quantity. When the first CSD is determined, the total quantity of the CSDs in the cyclic shift diversity sequence in the first cyclic shift diversity sequence subgroup is obtained as follows: selecting X−1 CSDs of remaining antennas from remaining Z−1 selectable CSDs.

402: Perform interpolation processing on the first cyclic shift diversity sub-sequence subgroup.

In this embodiment, the apparatus for selecting a cyclic shift diversity sequence performs interpolation processing on the cyclic shift diversity sequence in the first cyclic shift diversity sub-sequence subgroup. Because the first CSD in the cyclic shift diversity sequence is determined as 0 ns, when the first CSD remains unchanged, interpolation processing is performed on the cyclic shift diversity sequence, so that all CSDs in a cyclic shift diversity sequence obtained through the processing are arranged in an alternate-small-and-large manner.

Specifically, interpolation processing is performed on the cyclic shift diversity sequence in the first cyclic shift diversity sequence subgroup to generate a first cyclic shift diversity sequence, where at least one first cyclic shift diversity sequence constitutes a first cyclic shift diversity sequence group.

After the cyclic shift diversity sequence group is obtained through interpolation processing, step 403 is performed.

403: Obtain a candidate cyclic shift diversity sequence group through selection.

In this embodiment, the apparatus for selecting a cyclic shift diversity sequence configures a cyclic shift diversity sequence for a data frame for use. The data frame is referred to as a first data frame, and the data frame includes a first data subframe conforming to a first communication mechanism, a second data subframe conforming to a second communication mechanism, and a third data subframe conforming to the first communication mechanism. The first cyclic shift diversity sequence is used for the first communication mechanism. In the EHT standard, the first data subframe corresponds to a legacy short training sequence L-STF, the second data subframe corresponds to an extremely high throughput short training sequence EHT-STF, and the third data subframe corresponds to a legacy long training sequence L-LTF, a legacy signal sequence L-SIG, a repeated legacy signal sequence RL-SIG, an extremely high throughput signal field A EHT-SIG-A, and an extremely high throughput signal field B EHT-SIG-B.

A specific selection process is as follows:

First, the apparatus for selecting a cyclic shift diversity sequence generates a first signal power difference group based on a signal power difference between the first data subframe and third data subframe in the first data frame. A specific method for calculating the signal power difference between the first data subframe and the third data subframe is as follows:

$$R1 = 10 \log_{10}(\text{mean}(C1_i^2)/\text{mean}(C3_i^2)).$$

Herein, $C1_i$ is a signal sample of the first data subframe, $C3_i$ is a signal sample of the third data subframe, i is a sampling sequence number corresponding to an applied cyclic shift diversity sequence, and R1 is a first signal power ratio group. The first signal power ratio group includes at least one signal power difference between the first data subframe and third data subframe for which the cyclic shift diversity sequence is used. R1 is also referred to as a statistical power ratio. After the statistical power ratio between the first data subframe and the third data subframe is obtained, a power ratio whose probability result in a cumulative distribution function (CDF) of R1 is within a first probability distribution range is taken. A first signal power ratio with a smallest cumulative distribution probability in the first probability distribution range is subtracted from a first signal power ratio with a largest cumulative distribution probability in the first probability distribution range, to obtain a first signal power difference ($D1_b$). The first signal power difference group includes at least one first signal power difference, and each first signal power difference corresponds to one sampling sequence number. The first signal power difference is usually referred to as an automatic gain control error (AGC Error) or an AGC error. Whether a difference between the first signal power difference and a first signal power difference whose value is the smallest in the first signal power difference group is less than or equal to a first threshold is calculated, and a specific calculation manner is as follows:

$$D1_b - D1(\min)_b \leq Y1$$

$D1_b$ represents the first signal power difference in the first signal power difference group, $D1(\min)_b$ represents the first signal power difference whose value is the smallest in the first signal power difference group, b represents transmission bandwidth of the first data frame, and Y1 represents the first threshold.

The transmission bandwidth of the first data frame is 20 megahertz, 40 megahertz, or 80 megahertz. The first probability distribution range may be 2.5% to 97.5%. It should be noted that the value of the first probability distribution range is merely used as an example for description. This is not limited herein. For example, 2.0% to 98.0% may be selected as the first probability distribution range. The first threshold may be 0.1. A specific value of the first threshold is not limited herein.

If a calculation result is that the difference between the first signal power difference and the first signal power difference whose value is the smallest in the first signal power difference group is less than or equal to the first threshold, the signal power difference between the first data subframe and second data subframe in the first data frame is arranged in ascending order, to generate a second signal power difference group. The second signal power difference group includes at least one second signal power difference. A specific method for calculating the signal power difference between the first data subframe and the second data subframe is as follows:

$$R2 = 10 \log_{10}(\text{mean}(C1_i^2)/\text{mean}(C3_i^2)).$$

$C1_i$ is a signal sample of the first data subframe, $C2_i$ is a signal sample of the second data subframe, i is a sampling sequence number corresponding to an applied cyclic shift diversity sequence, and R2 is a second signal power ratio group. The second signal power ratio group includes at least one signal power difference between the first data subframe and second data subframe for which the cyclic shift diversity sequence is used. R2 is also referred to as a statistical power ratio. After the statistical power ratio between the first data subframe and the second data subframe is obtained, a power ratio whose probability result in a cumulative distribution function (CDF) of R2 is within the first probability distribution range is taken. A second signal power ratio with a smallest cumulative distribution probability in the first probability distribution range is subtracted from a second signal power ratio with a largest cumulative distribution probability in the first probability distribution range, to obtain a second signal power difference (D2). The second signal power difference group includes at least one second signal power difference, and each second signal power difference corresponds to one sampling sequence number. The second signal power difference is also referred to as an L-STF/EHT-STF power difference. Second signal power differences in the second signal power difference group are arranged in ascending order.

A second signal power difference arranged within the first second threshold range is selected from the second signal power difference group, to obtain a third signal power difference group through selection. All cyclic shift diversity sequences in the third signal power difference group constitute the candidate cyclic shift diversity sequence group. For example, when the second signal power difference group includes 10 second signal power differences, the second signal power differences in the second signal power difference group are [1, 2, 3, 4, 5, 6, 7, 8, 9, 10]. In this case, when the second threshold range is ⅓, signal power differences in the third signal power difference group obtained through selection are [1, 2, 3]. It should be noted that, in the third signal power difference group, each signal power difference corresponds to one cyclic shift diversity sequence. A cyclic shift diversity sequence group corresponding to the third signal power difference group is referred to as the candidate cyclic shift diversity sequence group. It should be noted that the second threshold range may be ⅓, or may be ½ or the like. A specific value of the second threshold range is not limited herein.

Specifically, the third signal power difference group is obtained through selection in the following manner:

rank(D2)b≤Y2*(N2).

D2 represents the second signal power difference, b represents transmission bandwidth of the first data frame, Y2 represents the second threshold range, and N2 is the second signal power difference group.

When a quantity of shift diversity sequences in the candidate cyclic shift diversity sequence group obtained through selection or the second signal power difference in the third signal power difference group does not reach a predetermined target, step 403 is repeatedly performed. For example, when a total quantity of shift diversity sequences in the candidate cyclic shift diversity sequence group is comparatively large, or the second signal power difference corresponding to the cyclic shift diversity sequence in the candidate cyclic shift diversity sequence group is comparatively large, the foregoing selection step is repeatedly performed. When the quantity of cyclic shift diversity sequences meets a preset condition and is less than or equal to 1, or the second signal power difference in the third signal power difference group reaches the predetermined target, the step is ended, and an optimal candidate cyclic shift diversity sequence group is obtained.

In this embodiment of this application, under the EHT standard, a preferred cyclic shift diversity sequence can be obtained through selection from massive combinations of CSD values. Work efficiency is improved, and an operation burden is reduced.

For ease of understanding, the following further describes the technical solutions of this application by using application scenarios.

For ease of description, CSD values are numbered below. For details, refer to Table 3.

TABLE 3

| | CSD value (ns) | | | | | | | | |
|---|---|---|---|---|---|---|---|---|---|
| | 0 | −12.5 | −25 | −37.5 | −50 | −62.5 | −75 | −87.5 | −100 |
| Sequence number | 1 | 2 | 3 | 4 | 5 | 6 | 7 | 8 | 9 |
| | CSD value (ns) | | | | | | | |
| | −112.5 | −125 | −137.5 | −150 | −162.5 | −175 | −187.5 | −200 |
| Sequence number | 10 | 11 | 12 | 13 | 14 | 15 | 16 | 17 |

If the target transmit antenna quantity of the wireless communications device is 16, an implementation is as follows.

Each CSD value is a multiple of 12.5 ns, and a value on each antenna is different.

Step 1: The apparatus for selecting a cyclic shift diversity sequence selects 16 different values from [0, −12.5, −25, −37.5, −50, −62.5, −75, −87.5, −100, −112.5, −125, −137.5, −150, −162.5, −175, −187.5, −200], and arranges all the values in descending order. According to a CSD distribution rule for a case in which an antenna quantity is less than or equal to 8, where the first value is fixed as 0, there are a total of $C_{16}^{15}=16$ different combinations. A different number is set for each value in [0, −12.5, −25, −37.5, −50, −62.5, −75, −87.5, −100, −112.5, −125, −137.5, −150, −162.5, −175, −187.5, −200] in a one-to-one correspondence manner in Table 3. The following directly uses a corresponding number to represent a corresponding CSD value. The current 16 CSD sequences are considered as the first cyclic shift diversity sequence subgroup.

Step 2: Change an order of (perform interpolation processing on) CSD values in each of the 16 cyclic shift diversity sequences obtained in step 1. According to a legacy part CSD value distribution rule for a case in which a transmit antenna quantity is less than or equal to 8, it can be learned that a value 17 may follow a value 1 or may be in the last position. Therefore, sorting processing is performed on the 16 different sequences obtained in step 1. Through observation, it can be learned that, regardless of whether the value 17 follows the value 1 or the value 17 is in the last position, a result obtained by sorting the values in the cyclic shift diversity sequence in an alternate-small-and-large manner is optimal. For example, through sorting of a sequence [1, 2, 3, 4, 5, 6, 7, 8, 9, 11, 12, 13, 14, 15, 16, 17], [1, 17, 2, 16, 3, 15, 4, 14, 5, 13, 6, 12, 7, 11, 8, 9] and a sequence [1, 16, 2, 15, 3, 14, 4, 13, 5, 12, 6, 11, 7, 9, 8, 17] are obtained. Sorting is performed on each of the 16 cyclic shift diversity sequences obtained in step 1, according to the foregoing alternate-small-and-large sorting rule. For each sequence, two sequences in different sorting ways are obtained. A total of 32 different sequences are obtained. The current 32 CSD sequences are considered as the first cyclic shift diversity sequence group.

Step 3: A transmit end of the apparatus for selecting a cyclic shift diversity sequence sends, through a TGn channel D under bandwidth conditions of 20 MHz, 40 MHz, and 80 MHz, signals for which the 32 different cyclic shift diversity sequences in step 2 are used; a receive end of the apparatus for selecting a cyclic shift diversity sequence obtains a corresponding received signal; and the apparatus for selecting a cyclic shift diversity sequence calculates a legacy-part AGC error D1 and an L-STF/EHT-STF power difference D2, where the power differences D1 and D2 are power differences whose cumulative distribution function probabilities of respective power ratios R range from 2.5% to 97.5%, a difference between AGC errors D1 is not obvious, and a difference between each AGC error and an optimal AGC error only needs to be kept within a range of 0.1 decibels (dB), whereas the L-STF/EHT-STF difference D2 is comparatively large and may be used to compare advantages and disadvantages of different cyclic shift diversity sequences; compares AGC errors D1 at bandwidths of 20 MHz, 40 MHz, and 80 MHz, to ensure that a difference between a D1 value at each bandwidth and a minimum D1 value at the bandwidth is within the range of 0.1 decibels (dB), and exclude a sequence that does not meet this condition; then sorts L-STF/EHT-STF power differences D2 in ascending order; and then selects all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 16 antennas is [1, 16, 2, 15, 3, 14, 4, 13, 5, 12, 6, 11, 7, 9, 8, 17].

TABLE 4

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 3, 4, 5, 6, 7, 8, 9, 11, 12, 13, 14, 15, 16, 17] | 1.25 | 1.60 | 1.13 | 13.38 | 7.95 | 4.83 |
| [1, 17, 2, 16, 3, 15, 4, 14, 5, 13, 6, 12, 7, 11, 8, 9] | 1.19 | 1.52 | 1.05 | 12.25 | 6.58 | 4.18 |
| [1, 16, 2, 15, 3, 14, 4, 13, 5, 12, 6, 11, 7, 9, 8, 17] | 1.18 | 1.58 | 1.04 | 11.91 | 6.44 | 4.13 |

If the target transmit antenna quantity is 15, an implementation is as follows.

Each CSD value is a multiple of 12.5 ns, and a value on each antenna is different.

Step 1: Select 15 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{14}=120$ different combinations. The current 120 CSD sequences are considered as the first cyclic shift diversity sequence subgroup.

Step 2: Change an order of the CSD values in the 120 cyclic shift diversity sequences obtained in step 1, so that the CSDs are sorted in an alternate-small-and-large manner. For each sequence, two sequences in different sorting ways are obtained. Using [1, 2, 3, 5, 6, 7, 8, 9, 10, 11, 13, 14, 15, 16, 17] as an example, two sequences obtained through sorting are [1, 17, 2, 16, 3, 15, 5, 14, 6, 13, 7, 11, 8, 10, 9] and [1, 16, 2, 15, 3, 14, 5, 13, 6, 11, 7, 10, 8, 9, 17]. In the former, a sequence number 17 follows a sequence number 1. In the latter, the sequence number 17 is in the last position. Other values are sorted in the alternate-small-and-large manner. A total of 240 different cyclic shift diversity sequences are obtained. The current 240 CSD sequences are considered as the first cyclic shift diversity sequence group.

Step 3: Calculate AGC errors D1 and L-STF/EHT-STF power differences D2 of signals for which the 240 sequences in step 2 are used; compare AGC errors D1 of the 240 sequences at bandwidths of 20 MHz, 40 MHz, and 80 MHz, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 15 antennas is [1, 16, 2, 15, 3, 14, 5, 13, 6, 11, 7, 10, 8, 9, 17].

TABLE 5

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 3, 5, 6, 7, 8, 9, 10, 11, 13, 14, 15, 16, 17] | 1.26 | 1.28 | 0.88 | 12.93 | 7.55 | 4.73 |
| [1, 17, 2, 16, 3, 15, 5, 14, 6, 13, 7, 11, 8, 10, 9] | 1.20 | 1.27 | 0.84 | 11.98 | 6.36 | 4.15 |
| [1, 16, 2, 15, 3, 14, 5, 13, 6, 11, 7, 10, 8, 9, 17] | 1.20 | 1.29 | 0.84 | 11.61 | 6.30 | 4.04 |

If the target transmit antenna quantity is 14, an implementation is as follows.

Each CSD value is a multiple of 12.5 ns, and a value on each antenna is different.

Step 1: Select 14 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{13}=560$ different combinations. The current 560 CSD sequences are considered as the first cyclic shift diversity sequence subgroup.

Step 2: Change an order of the CSD values in the 560 cyclic shift diversity sequences obtained in step 1, so that the CSDs are sorted in an alternate-small-and-large manner. For each sequence, two sequences in different sorting ways are obtained. Using a sequence [1, 2, 3, 4, 5, 6, 8, 10, 11, 12, 13, 15 16, 17] as an example, two sequences [1, 17, 2, 16, 3, 15, 4, 13, 5, 12, 6, 11, 8, 10] and [1, 16, 2, 15, 3, 13, 4, 12, 5, 11, 6, 10, 8, 17] are obtained through sorting. In the former, a sequence number 17 follows a sequence number 1. In the latter, the sequence number 17 is in the last position. Other values are sorted in the alternate-small-and-large manner. A total of 1120 different sequences are obtained. The current 1120 CSD sequences are considered as the first cyclic shift diversity sequence group.

Step 3: Calculate AGC errors D1 and L-STF/EHT-STF power differences D2 of signals for which the 1120 sequences in step 2 are used; compare AGC errors D1 of the 1120 sequences at bandwidths of 20 MHz, 40 MHz, and 80

MHz, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 14 antennas is [1, 16, 2, 15, 3, 13, 4, 12, 5, 11, 6, 10, 8, 17].

TABLE 6

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 3, 4, 5, 6, 8, 10, 11, 12, 13, 15 16, 17] | 1.26 | 1.25 | 0.80 | 12.66 | 7.35 | 4.47 |
| [1, 17, 2, 16, 3, 15, 4, 13, 5, 12, 6, 11, 8, 10] | 1.21 | 1.24 | 0.78 | 11.39 | 6.14 | 4.18 |
| [1, 16, 2, 15, 3, 13, 4, 12, 5, 11, 6, 10, 8, 17] | 1.22 | 1.26 | 0.77 | 11.24 | 5.92 | 3.99 |

If the target transmit antenna quantity of the wireless communications device is 13, an implementation is as follows.

Each CSD value is a multiple of 12.5 ns, and a value on each antenna is different.

Step 1: Select 13 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{12}=1820$ different combinations. The current 1820 CSD sequences are considered as the first cyclic shift diversity sequence subgroup.

Step 2: Change an order of the CSD values in the cyclic shift diversity sequence in the performed on the CSDs in an alternate-small-and-large sorting manner. Using a sequence [1, 2, 4, 5, 6, 8, 10, 11, 12, 14, 15, 16, 17] as an example, [1, 17, 2, 16, 4, 15, 5, 14, 6, 12, 8, 11, 10] and [1, 16, 2, 15, 4, 14, 5, 12, 6, 11, 8, 10, 17] are obtained. In the former, a value with a sequence number 17 follows a value with a sequence number 1. In the latter, 17 is in the last position. Other values are sorted in the alternate-small-and-large manner. 3640 different cyclic shift diversity sequences are obtained. The current 3640 CSD sequences are considered as the first cyclic shift diversity sequence group.

Step 3: Calculate AGC errors D1 and L-STF/EHT-STF power differences D2 of signals for which the 3640 sequences in step 2 are used; compare AGC errors D1 of the 3640 sequences at bandwidths of 20 MHz, 40 MHz, and 80 MHz, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 13 antennas is [1, 16, 2, 15, 4, 14, 5, 12, 6, 11, 8, 10, 17].

TABLE 7

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 4, 5, 6, 8, 10, 11, 12, 14, 15, 16, 17] | 1.25 | 1.29 | 0.81 | 12.23 | 6.90 | 4.36 |
| [1, 17, 2, 16, 4, 15, 5, 14, 6, 12, 8, 11, 10] | 1.19 | 1.23 | 0.78 | 11.21 | 5.87 | 3.91 |
| [1, 16, 2, 15, 4, 14, 5, 12, 6, 11, 8, 10, 17] | 1.20 | 1.26 | 0.76 | 10.84 | 5.75 | 3.93 |

If the target transmit antenna quantity of the wireless communications device is 12, an implementation is as follows.

Each CSD value is a multiple of 12.5 ns, and a value on each antenna is different.

Step 1: Select 12 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{11}=4368$ different combinations. The current 4368 CSD sequences are considered as the first cyclic shift diversity sequence subgroup.

Step 2: Change an order of the CSD values in the cyclic shift diversity sequence in the first cyclic shift diversity sequence subgroup obtained in step 1. Interpolation processing is performed on the CSDs in an alternate-small-and-large sorting manner. Using a sequence [1, 2, 4, 5, 7, 9, 10, 11, 13, 15, 16, 17] as an example, [1, 17, 2, 16, 4, 15, 5, 13, 7, 11, 9, 10] and [1, 16, 2, 15, 4, 13, 5, 11, 7, 10, 9, 17] are obtained. In the former, a value with a sequence number 17 follows a value with a sequence number 1. In the latter, 17 is in the last position. Other values are sorted in the alternate-small-and-large manner. 8736 different cyclic diversity sequences are obtained. The current 8736 CSD sequences are considered as the first cyclic shift diversity sequence group.

Step 3: Calculate AGC errors D1 and L-STF/EHT-STF power differences D2 of signals for which the 8736 sequences in step 2 are used; compare AGC errors D1 of the 8736 sequences at bandwidths of 20 MHz, 40 MHz, and 80 MHz, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 12 antennas is [1, 16, 2, 15, 4, 13, 5, 11, 7, 10, 9, 17].

TABLE 8

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 4, 5, 7, 9, 10, 11, 13, 15, 16, 17] | 1.27 | 1.28 | 0.81 | 11.51 | 6.59 | 4.12 |
| [1, 17, 2, 16, 4, 15, 5, 13, 7, 11, 9, 10] | 1.27 | 1.32 | 0.81 | 10.39 | 5.43 | 3.90 |
| [1, 16, 2, 15, 4, 13, 5, 11, 7, 10, 9, 17] | 1.22 | 1.28 | 0.82 | 10.19 | 5.47 | 3.84 |

If the target transmit antenna quantity of the wireless communications device is 11, an implementation is as follows.

Each CSD value is a multiple of 12.5 ns, and a value on each antenna is different.

Step 1: Select 11 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{10}=8008$ different combinations. The current 8008 CSD sequences are considered as the first cyclic shift diversity sequence subgroup.

Step 2: Change an order of the CSD values in the cyclic shift diversity sequence in the first cyclic shift diversity sequence subgroup obtained in step 1. Interpolation processing is performed on the CSDs in an alternate-small-and-large sorting manner. Using a sequence [1, 2, 3, 5, 8, 10, 12, 14, 15, 16, 17] as an example, [1, 16, 2, 15, 3, 14, 5, 12, 8, 10, 17] and [1, 17, 2, 16, 3, 15, 5, 14, 8, 12, 10] are obtained. In the former, a value with a sequence number 17 follows a value with a sequence number 1. In the latter, 17 is in the last position. Other values are sorted in the alternate-small-and-large manner. 16016 different cyclic shift diversity sequences are obtained. The current 16016 CSD sequences are considered as the first cyclic shift diversity sequence group.

Step 3: Calculate AGC errors D1 and L-STF/EHT-STF power differences D2 of signals for which the 16016 sequences in step 2 are used; compare AGC errors D1 of the 16016 sequences at bandwidths of 20 MHz, 40 MHz, and 80 MHz, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 11 antennas is [1, 16, 2, 15, 3, 14, 5, 12, 8, 10, 17].

TABLE 9

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 3, 5, 8, 10, 12, 14, 15, 16, 17] | 1.26 | 1.20 | 0.69 | 11.12 | 6.28 | 4.19 |

TABLE 9-continued

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 17, 2, 16, 3, 15, 5, 14, 8, 12, 10] | 1.23 | 1.17 | 0.68 | 10.02 | 5.68 | 3.87 |
| [1, 16, 2, 15, 3, 14, 5, 12, 8, 10, 17] | 1.21 | 1.22 | 0.69 | 9.68 | 5.70 | 3.98 |

If the target transmit antenna quantity of the wireless communications device is 10, an implementation is as follows.

Each CSD value is a multiple of 12.5 ns, and a value on each antenna is different.

Step 1: Select 10 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{9}=11440$ different combinations. The current 11440 CSD sequences are considered as the first cyclic shift diversity sequence subgroup.

Step 2: Change an order of the CSD values in the cyclic shift diversity sequence in the performed on the CSDs in an alternate-small-and-large sorting manner. Using a sequence [1, 2, 3, 4, 7, 10, 14, 15, 16, 17] as an example, [1, 16, 2, 15, 3, 14, 4, 10, 7, 17] and [1, 17, 2, 16, 3, 15, 4, 14, 7, 10] are obtained. In the former, a value with a sequence number 17 follows a value with a sequence number 1. In the latter, 17 is in the last position. Other values are sorted in the alternate-small-and-large manner. 22880 different cyclic shift diversity sequences are obtained. The current 22880 CSD sequences are considered as the first cyclic shift diversity sequence group.

Step 3: Compare, at bandwidths of 20 MHz, 40 MHz, and 80 MHz, AGC errors D1 of the 22880 sequences obtained in step 2, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for 10 antennas is [1, 16, 2, 15, 3, 14, 4, 10, 7, 17].

TABLE 10

| CSD sequence | D1 (dB) | | | D2 (dB) | | |
|---|---|---|---|---|---|---|
| | 20 MHz | 40 MHz | 80 MHz | 20 MHz | 40 MHz | 80 MHz |
| [1, 2, 3, 4, 7, 10, 14, 15, 16, 17] | 1.23 | 1.11 | 0.71 | 10.40 | 6.41 | 3.91 |
| [1, 17, 2, 16, 3, 15, 4, 14, 7, 10] | 1.24 | 1.09 | 0.66 | 9.78 | 5.76 | 3.80 |
| [1, 16, 2, 15, 3, 14, 4, 10, 7, 17] | 1.24 | 1.09 | 0.66 | 9.56 | 5.76 | 3.80 |

If the target transmit antenna quantity of the wireless communications device is 9, an implementation is as follows.

Each CSD value is a multiple of 12.5 ns, and a value on each antenna is different.

Step 1: Select 9 different values in descending order from [0, −12.5, −25, −37.5, −50, −62.5, −75, −87.5, −100, −112.5, −125, −137.5, −150, −162.5, −175, −187.5, −200], where the first value is fixed as 0, and there are a total of $C_{16}^{8}=12870$ different combinations. The current 12870 CSD sequences are considered as the first cyclic shift diversity sequence subgroup.

Step 2: Change an order of the CSD values in the cyclic shift diversity sequence in the first cyclic shift diversity sequence subgroup obtained in step 1. Interpolation processing is performed on the CSDs in an alternate-small-and-large sorting manner. Using a sequence [1, 2, 3, 7, 10, 14, 15, 16, 17] as an example, [1, 16, 2, 15, 3, 14, 7, 10, 17] and [1, 17, 2, 16, 3, 15, 7, 14, 10] are obtained. In the former, a value with a sequence number 17 follows a value with a sequence number 1. In the latter, 17 is in the last position. Other values are sorted in the alternate-small-and-large manner. 25740 different cyclic shift diversity sequences are obtained. The current 25740 CSD sequences are considered as the first cyclic shift diversity sequence group.

Step 3: Compare, at bandwidths of 20 MHz, 40 MHz, and 80 MHz, AGC errors D1 of the 25740 sequences obtained in step 2, to ensure that a difference between a D1 value at each bandwidth and a minimum D1 value at the bandwidth is within a range of 0.1 decibels (dB), and exclude a sequence that does not meet this condition; then sort L-STF/EHT-STF power differences D2 in ascending order; and then select all sequences whose D2 performance at respective bandwidths is in the first ⅓, as the candidate cyclic shift diversity sequence group. If the quantity of sequences in the candidate cyclic shift diversity sequence group is greater than 1 or does not meet the preset condition, step 3 is repeatedly performed on the current candidate cyclic shift diversity sequence group until the quantity of sequences in the candidate cyclic shift diversity sequence group is 1 or meets the preset condition. When a sequence quantity in the preset condition is 1, an obtained optimal sequence for nine antennas is [1, 16, 2, 15, 3, 14, 7, 10, 17].

TABLE 11

| CSD sequence | D1 (dB) | | | D2 (dB) | | |
| --- | --- | --- | --- | --- | --- | --- |
| | 20 MHz | 40 MHz | 80 MHz | 20 MHz | 40 MHz | 80 MHz |
| [1, 2, 3, 7, 10, 14, 15, 16, 17] | 1.25 | 1.09 | 0.70 | 10.08 | 6.19 | 3.88 |
| [1, 17, 2, 16, 3, 15, 7, 14, 10] | 1.25 | 1.14 | 0.71 | 9.26 | 5.33 | 3.70 |
| [1, 16, 2, 15, 3, 14, 7, 10, 17] | 1.27 | 1.09 | 0.68 | 9.22 | 5.40 | 3.63 |

In this embodiment of this application, the apparatus for selecting a cyclic shift diversity sequence selects, from massive cyclic shift diversity sequences, optimal cyclic shift diversity sequences applicable to cases of a plurality of transmit antenna quantities. By applying the optimal cyclic shift diversity sequence, the wireless communications device can avoid a beamforming effect of a legacy part of a signal, and minimize power differences between a legacy short training sequence L-STF and an extremely high throughput short training sequence EHT-STF, and between the L-STF and a legacy long training sequence L-LTF, a legacy signal sequence L-SIG, a repeated legacy signal sequence RL-SIG, an extremely high throughput signal field A EHT-SIG-A, and an extremely high throughput signal field B EHT-SIG-B.

Figure 5:
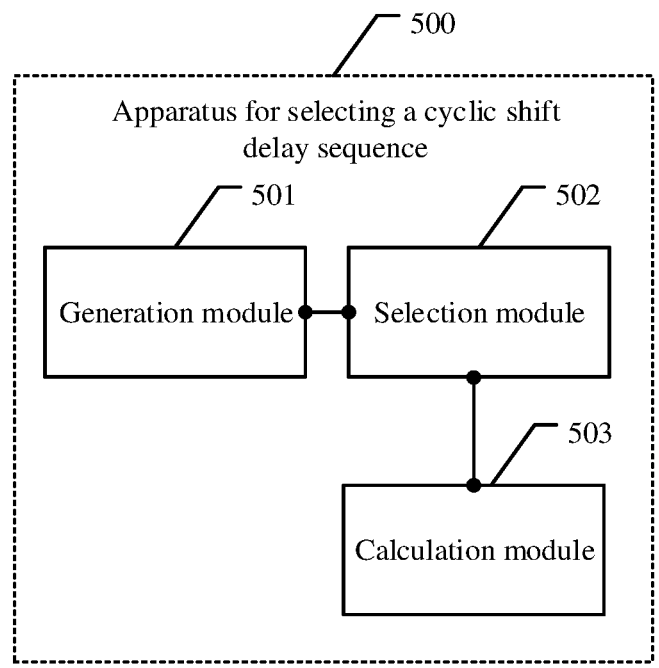
FIG. 5 is a schematic structural diagram of an apparatus for selecting a cyclic shift diversity sequence according to an embodiment of this application.

Next, referring to FIG. 5, an embodiment of this application further provides an apparatus 500 for selecting a cyclic shift diversity sequence, including:

a generation module 501, configured to generate a first cyclic shift diversity sequence group based on a target transmit antenna quantity, where the first cyclic shift diversity sequence group includes at least one first cyclic shift diversity sequence, the first cyclic shift diversity sequence includes at least one cyclic shift diversity CSD, and a quantity of CSDs in the first cyclic shift diversity sequence is equal to the target transmit antenna quantity; and a selection module 502, configured to obtain a candidate cyclic shift diversity sequence group through selection based on a magnitude of a signal power difference between a first data subframe and second data subframe in a first data frame and a magnitude of a signal power difference between the first data subframe and a third data subframe in the first data frame, where the candidate cyclic shift diversity sequence group includes at least one first cyclic shift diversity sequence, the first data frame includes the first data subframe conforming to a first communication mechanism, the second data subframe conforming to a second communication mechanism, and the third data subframe conforming to the first communication mechanism, and the first cyclic shift diversity sequence in the first cyclic shift diversity sequence group is used for the first communication mechanism.

In some embodiments of this application, the generation module 501 is further configured to generate a first cyclic shift diversity sequence subgroup based on the target transmit antenna quantity, where a quantity of CSDs in the first cyclic shift diversity sequence subgroup is equal to the target transmit antenna quantity.

The generation module 501 is further configured to perform interpolation processing on a cyclic shift diversity sequence in the first cyclic shift diversity sequence subgroup to generate the first cyclic shift diversity sequence group.

In some embodiments of this application, (1) the selection module 502 is further configured to obtain the candidate cyclic shift diversity sequence group through selection based on the magnitude of the signal power difference between the first data subframe and second data subframe in the first data frame and the magnitude of the signal power difference between the first data subframe and third data subframe in the first data frame, where the candidate cyclic shift diversity sequence group includes at least one first cyclic shift diversity sequence, the first data frame includes the first data subframe conforming to the first communication mechanism, the second data subframe conforming to the second communication mechanism, and the third data subframe conforming to the first communication mechanism, and the first cyclic shift diversity sequence in the first cyclic shift diversity sequence group is used for the first communication mechanism.

Step (1) is repeatedly performed until a quantity of cyclic shift diversity sequences in the candidate cyclic shift diversity sequence group obtained through selection meets a preset condition.

In some embodiments of this application, the generation module 501 is specifically configured to generate a first signal power difference group based on the signal power difference between the first data subframe and third data subframe in the first data frame, where the first signal power difference group includes at least one first signal power difference.

A calculation module 503 is configured to calculate whether a difference between the first signal power difference and a first signal power difference whose value is the smallest in the first signal power difference group is less than or equal to a first threshold.

If yes, the generation module 501 is specifically configured to arrange, in ascending order, the signal power difference between the first data subframe and second data subframe in the first data frame, to generate a second signal power difference group, where the second signal power difference group includes at least one second signal power difference.

The selection module 502 is specifically configured to select, from the second signal power difference group, a second signal power difference arranged within the first second threshold range, to obtain a third signal power difference group through selection, where all cyclic shift diversity sequences in the third signal power difference group constitute the candidate cyclic shift diversity sequence group.

In some embodiments of this application, the first threshold is 0.1, and the second threshold is ⅓.

In some embodiments of this application, the calculating whether a difference between the first signal power difference and a first signal power difference whose value is the smallest in the first signal power difference group is less than or equal to a first threshold includes:
determining, in the following manner, whether the difference is less than the first threshold:

$$D1_b - D1(\min)_b \leq Y1.$$

$D1_b$ represents the first signal power difference in the first signal power difference group, $D1(\min)_b$ represents the first signal power difference whose value is the smallest in the first signal power difference group, b represents transmission bandwidth of the first data frame, and Y1 represents the first threshold.

In some embodiments of this application, the transmission bandwidth of the first data frame is 20 megahertz, 40 megahertz, or 80 megahertz.

In some embodiments of this application, the selecting a second signal power difference arranged within the first second threshold range, to obtain a third signal power difference group through selection includes:
obtaining the third signal power difference group through selection in the following manner:

$$\text{rank}(D2)_b \leq Y2*(N2).$$

D2 represents the second signal power difference, b represents transmission bandwidth of the first data frame, Y2 represents the second threshold range, and N2 is the second signal power difference group.

In some embodiments of this application, the first data subframe corresponds to a legacy short training sequence L-STF, the second data subframe corresponds to an extremely high throughput short training sequence EHT-STF, and the third data subframe corresponds to a legacy long training sequence L-LTF, a legacy signal sequence L-SIG, a repeated legacy signal sequence RL-SIG, an extremely high throughput signal field A EHT-SIG-A, and an extremely high throughput signal field B EHT-SIG-B.

In some embodiments of this application, the CSD is an integral multiple of a first time period, the first time period is 12.5 nanoseconds or 25 nanoseconds, and a value of the CSD is within a range from 0 nanoseconds to 200 nanoseconds.

In some embodiments of this application, the target transmit antenna quantity is 9, 10, 11, 12, 13, 14, 15, or 16.

In the foregoing embodiment, the generation module, the calculation module, and the selection module may be implemented by a processor.

Figure 6:
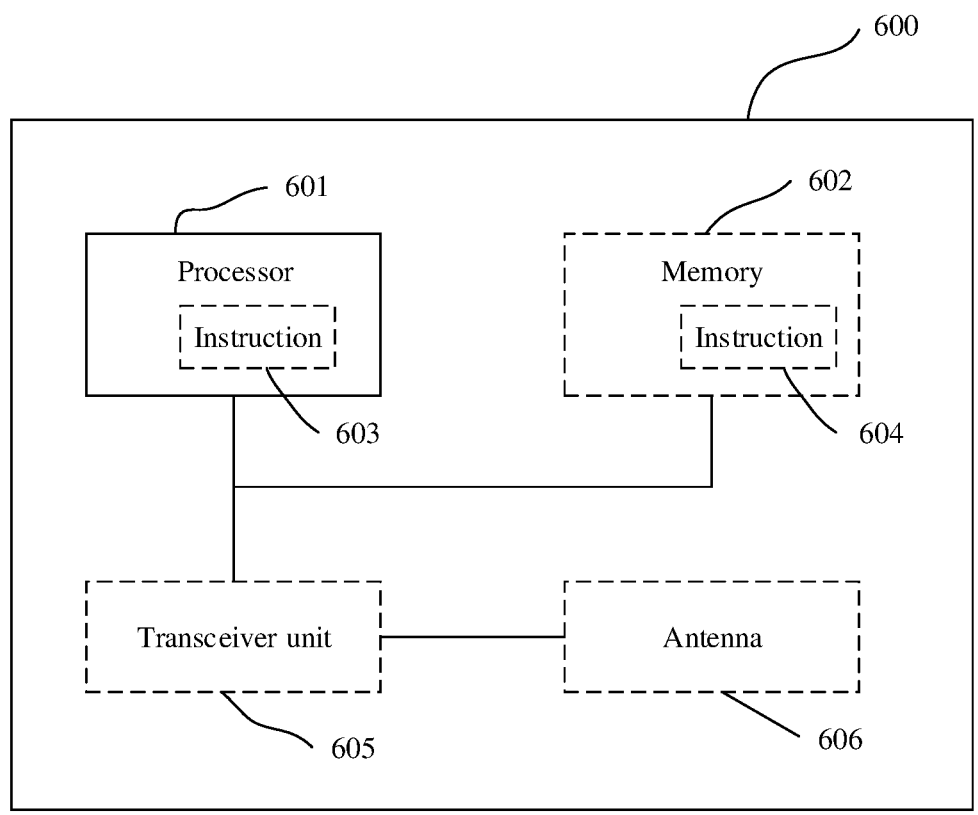
FIG. 6 is a schematic structural diagram of a communications apparatus according to an embodiment of this application.

FIG. 6 is a schematic structural diagram of a communications apparatus 600. The communications apparatus 600 may be configured to implement the method described in the foregoing method embodiments. Refer to descriptions in the foregoing method embodiments. The communications apparatus 600 may be a chip, a network device (such as a base station), a terminal device, a core network device, another network device, or the like.

The communications apparatus 600 includes one or more processors 601. The processor 601 may be a general purpose processor, a dedicated processor, or the like. For example, the processor may be a baseband processor or a central processing unit. The baseband processor may be configured to process a communications protocol and communication data. The central processing unit may be configured to control the communications apparatus (for example, a base station, a terminal, or a chip), execute a software program, and process data of the software program. The communications apparatus may include a transceiver unit, configured to input (receive) and output (send) signals. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 600 includes the one or more processors 601, and the one or more processors 601 may implement the method for selecting a cyclic shift diversity sequence in the foregoing embodiments.

In a possible design, the communications apparatus 600 is configured to generate a first cyclic shift diversity sequence group. The first cyclic shift diversity sequence group may be generated by using the one or more processors. For example, the first cyclic shift diversity sequence group may be generated by using the one or more processors. For the first cyclic shift diversity sequence group, refer to related descriptions in the foregoing method embodiments.

In a possible design, the communications apparatus 600 includes being configured to obtain a candidate cyclic shift diversity sequence group through selection. For the candidate cyclic shift diversity sequence group, refer to related descriptions in the foregoing method embodiments. For example, the candidate cyclic shift diversity sequence group is determined by using the one or more processors.

In a possible design, the communications apparatus 600 may be configured to send or receive a first data frame. The first data frame may be sent or received by using a transceiver, an input/output circuit, or an interface of a chip.

In addition to implementing the method in the embodiment shown in FIG. 2, the processor 601 may further implement another function.

In a design, the processor 601 may execute instructions, so that the communications apparatus 600 performs the method described in the foregoing method embodiments. All or some of the instructions may be stored in the processor, for example, an instruction 603; or may be stored in a memory 602 coupled to the processor, for example, an instruction 604. The instructions 603 and 604 may be alternatively used together to enable the communications apparatus 600 to perform the method described in the foregoing method embodiments.

In another possible design, the communications apparatus 600 may alternatively include a circuit. The circuit may implement a function of the apparatus for selecting a cyclic shift diversity sequence in the foregoing method embodiments.

In still another possible design, the communications apparatus 600 may include one or more memories 602 storing the instruction 604. The instruction may be run on the processor, so that the communications apparatus 600 performs the method described in the foregoing method embodiments. Optionally, the memory may further store data. Optionally, the processor may also store an instruction and/or data. For example, the one or more memories 602 may store the cyclic shift diversity sequence described in the foregoing embodiments. The processor and the memory may be separately disposed, or may be integrated with each other.

In still another possible design, the communications apparatus 600 may further include a transceiver unit 605 and an antenna 606. The processor 601 may be referred to as a processing unit, and controls the communications apparatus (a terminal or a base station). The transceiver unit 605 may be referred to as a transceiver, a transceiver circuit, or the like, and is configured to implement a transceiver function of the communications apparatus by using the antenna 606.

It should be noted that the processor in this embodiment of this application may be an integrated circuit chip, and has a signal processing capability. In an implementation process, steps in the foregoing method embodiments may be implemented by using an integrated logic circuit of hardware in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example rather than limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification is intended to include but is not limited to these memories and any memory of another suitable type.

An embodiment of this application further provides a computer program product including instructions managed by a storage block. When the computer program product is run on a computer, the computer is enabled to perform the steps performed by the processor in the methods described in the embodiments shown in FIG. 1 to FIG. 6.

An embodiment of this application further provides a computer-readable storage medium. The computer-readable storage medium stores instructions processed by a storage block. When the instructions are run on a computer, the computer is enabled to perform the steps performed by the processor in the methods described in the embodiments shown in FIG. 1 to FIG. 6.

An embodiment of this application further provides a chip system. The chip system includes a processor, configured to support a network device in implementing a function in the foregoing aspects, for example, sending or processing the cyclic shift diversity sequence in the foregoing methods. In a possible design, the chip system further includes a memory, and the memory is configured to store program instructions and data that are necessary for the network device. The chip system may include a chip, or may include a chip and another discrete device.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer instruction is loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium, or may be transmitted from a computer-readable storage medium to another computer-readable storage medium. For example, the computer instruction may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a compact digital video disc (DVD)), a semiconductor medium (for example, a solid-state drive (SSD)), or the like.

An embodiment of this application further provides a processing apparatus, including a processor and an interface. The processor is configured to perform the communication described in any one of the foregoing method embodiments.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general purpose processor, implemented by reading software code stored in a memory. The memory may be integrated into the processor, or may be located outside the processor and exist independently.

It should be understood that "an embodiment" or "one embodiment" mentioned in the entire specification means that particular features, structures, or characteristics related to the embodiment are included in at least one embodiment of this application. Therefore, "in an embodiment" or "in one embodiment" appearing throughout the specification does not necessarily refer to a same embodiment. In addition, these particular features, structures, or characteristics may be combined in one or more embodiments in any proper manner. It should be understood that, in various embodiments of this application, sequence numbers of the foregoing processes do not mean an execution sequence. An execution sequence of the processes should be determined based on functions and internal logic of the processes, and should not constitute any limitation on an implementation process of the embodiments of this application.

In addition, the terms "system" and "network" are usually used interchangeably in this specification. The term "and/or" in this specification means only an association relationship for describing associated objects, and represents that three relationships may exist. For example, A and/or B may represent the following three cases: Only A exists, both A and B exist, and only B exists. In addition, the character "/" in this specification generally indicates an "or" relationship between associated objects.

It should be understood that, in the embodiments of this application, "B corresponding to A" indicates that B is associated with A, and B may be determined based on A. However, it should be further understood that determining B based on A does not mean that B is determined based on only A, that is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing generally describes a composition and steps of each example based on functions. Whether the functions are performed by hardware or software depends on particular applications and design constraints of the technical solutions. A person skilled in the art may use different methods to implement the described functions for all particular applications, but it should not be considered that the implementation goes beyond the scope of this application.

It may be clearly understood by a person skilled in the art that, for ease and brevity of description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely logical function division, and may be other division in actual implementation. For example, a plurality of units or components may be combined, or may be integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each unit may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the method described in the embodiments of this application.

To sum up, the foregoing descriptions are merely examples of the embodiments of the technical solutions in this application, but are not intended to limit the protection scope of this application. Any modification, equivalent replacement, improvement, or the like made without departing from the principle of this application shall fall within the protection scope of this application.

The invention claimed is:

1. A method for sending a frame by using a cyclic shift diversity (CSD) sequence, comprising:
generating a frame, wherein the frame comprises a first data subframe conforming to a first communication mechanism and a second data subframe conforming to the first communication mechanism; and
sending the frame, wherein the first data subframe and the second data subframe are sent by using a cyclic shift diversity sequence including a plurality of CSD values, wherein a quantity of the plurality of CSD values in the cyclic shift diversity sequence is equal to a quantity of target transmit antennas, the quantity of target transmit antennas is larger than 8, and the cyclic shift diversity sequence is one of [0, −187.5, −12.5, −1.75, −25, −162.5, −75, −112.5, −200], [0, −187.5, −12.5, −175, −25, −162.5, −37.5, −112.5, −75, −200], [0, −187.5, −12.5, −175, −25, −162.5, −50, −137.5, −87.5, −112.5, −200], [0, −187.5, −12.5, −175, −37.5, −150, −50, −125, −75, −112.5, −100, −200], [0, −187.5, −12.5, −175, −37.5, −162.5, −50, −137.5, −62.5, −125, −87.5, −12.5, −200], [0, −187.5, −12.5, −175, −25, −150, −37.5, −137.5, −50, −125, −62.5, −112.5, −87.5, −200], [0, −187.5, −12.5, −175, −25, −162.5, −50, −150, −62.5, −112.5, −75, −125, −87.5, −100, −200], or [0, −187.5, −12.5, −175, −25, −162.5, −37.5, −150, −50, −137.5, −62.5, −125, −75, 100, −87.5, −200)].

2. The method according to claim 1, wherein the quantity of target transmit antennas is 9, and the cyclic shift diversity sequence is [0, −187.5, −12.5, −175, −25, −162.5, −75, −112.5, −200].

3. The method according to claim 1, wherein the quantity of target transmit antennas is 10, and the cyclic shift diversity sequence is [0, −187.5, −12.5, −175, −25, −162.5, −37.5, −112.5, −75, −200].

4. The method according to claim 1, wherein the quantity of target transmit antennas is 11, and the cyclic shift diversity sequence is [0, −187.5, −12.5, −175, −25, −162.5, −50, −137.5, −87.5, −112.5, −200].

5. The method according to claim 1, wherein the quantity of target transmit antennas is 12, and the cyclic shift diversity sequence is [0, −187.5, −12.5, −175, −37.5, −150, −50, −125, −75, −112.5, −100, −200].

6. The method according to claim 1, wherein the quantity of target transmit antennas is 13, and the cyclic shift diversity sequence is [0, −187.5, −12.5, −175, −37.5, −162.5, −50, −137.5, −62.5, −125, −87.5, −112.5, −200].

7. The method according to claim 1, wherein the quantity of target transmit antennas is 14, and the cyclic shift diversity sequence is [0, −187.5, −12.5, −175, −25, −150, −37.5, −137.5, −50, −125, −62.5, −112.5, −87.5, −200].

8. The method according to claim 1, wherein the quantity of target transmit antennas is 15, and the cyclic shift diversity sequence is [0, −187.5, −12.5, −175, −25, −162.5, −50, −150, −62.5, −112.5, −75, −125, −87.5, −100, −200].

9. The method according to claim 1, wherein the quantity of target transmit antennas is 16, and the cyclic shift diversity sequence is [0, −187.5, −12.5, −175, −25, −162.5, −37.5, −150, −50, −137.5, −62.5, −125, −75, −100, −87.5, −200].

10. A method for receiving a frame by using a cyclic shift diversity sequence, comprising:
receiving a frame, wherein the frame comprises a first data subframe conforming to a first communication mechanism and a second data subframe conforming to the first communication mechanism;
wherein the first data subframe and the second data subframe are sent by using a cyclic shift diversity (CSD) sequence including a plurality of CSD values, wherein a quantity of the plurality of CSD values in the cyclic shift diversity sequence is equal to a quantity of target transmit antennas, the quantity of target transmit antennas is larger than 8, and the cyclic shift diversity sequence is one of [0, −187.5, −12.5, −1.75, −25, −162.5, −75, −112.5, −200], [0, −187.5, −12.5, −175, −25, −162.5, −37.5, −112.5, −75, −200], [0, −187.5, −12.5, −175, −25, −162.5, −50, −137.5, −87.5, −112.5, −200], [0, −187.5, −12.5, −175, −37.5, −150, −50, −125, −75, −112.5, −100, −200], [0, −187.5, −12.5, −175, −37.5, −162.5, −50, −137.5, −62.5, −125, −87.5, −12.5, −200], [0, −187.5, −12.5, −175, −25, −150, −37.5, −137.5, −50, −125, −62.5, −112.5, −87.5, −200], [0, −187.5, −12.5, −175, −25, −162.5, −50, −150, −62.5, −112.5, −75, −125, −87.5, −100, −200], or [0, −187.5, −12.5, −175, −25, −162.5, −37.5, −150, −50, −137.5, −62.5, −125, −75, 100, −87.5, −200)].

11. The method according to claim 10, wherein the quantity of target transmit antennas is 9, and the cyclic shift diversity sequence is [0, −187.5, −12.5, −175, −25, −162.5, −75, −112.5, −200].

12. The method according to claim 10, wherein the quantity of target transmit antennas is 10, and the cyclic shift diversity sequence is [0, −187.5, −12.5, −175, −25, −162.5, −37.5, −112.5, −75, −200].

13. The method according to claim 10, wherein the quantity of target transmit antennas is 11, and the cyclic shift diversity sequence is [0, −187.5, −12.5, −175, −25, −162.5, −50, −137.5, −87.5, −112.5, −200].

14. The method according to claim 10, wherein the quantity of target transmit antennas is 12, and the cyclic shift diversity sequence is [0, −187.5, −12.5, −175, −37.5, −150, −50, −125, −75, −112.5, −100, −200].

15. The method according to claim 10, wherein the quantity of target transmit antennas is 13, and the cyclic shift diversity sequence is [0, −187.5, −12.5, −175, −37.5, −162.5, −50, −137.5, −62.5, −125, −87.5, −112.5, −200].

16. The method according to claim 10, wherein the quantity of target transmit antennas is 14, and the cyclic shift diversity sequence is [0, −187.5, −12.5, −175, −25, −150, −37.5, −137.5, −50, −125, −62.5, −112.5, −87.5, −200].

17. The method according to claim 10, wherein the quantity of target transmit antennas is 15, and the cyclic shift diversity sequence is [0, −187.5, −12.5, −175, −25, −162.5, −50, −150, −62.5, −112.5, −75, −125, −87.5, −100, −200].

18. The method according to claim 10, wherein the quantity of target transmit antennas is 16, and the cyclic shift diversity sequence is [0, −187.5, −12.5, −175, −25, −162.5, −37.5, −150, −50, −137.5, −62.5, −125, −75, −100, −87.5, −200].

* * * * *

UNITED STATES PATENT AND TRADEMARK OFFICE
CERTIFICATE OF CORRECTION

PATENT NO. : 12,388,509 B2
APPLICATION NO. : 18/495791
DATED : August 12, 2025
INVENTOR(S) : Kaifeng Xia Page 1 of 1

It is certified that error appears in the above-identified patent and that said Letters Patent is hereby corrected as shown below:

In the Specification

Column 16, Line 41, change "$R2=10 \log_{10}(\text{mean}(C1_i^2)/\text{mean}(C3_i^2))$" to --$R2=10 \log_{10}(\text{mean}(C1_i^2)/\text{mean}(C2_i^2))$--;

In the Claims

Column 32, Claim 1, Line 65, change "1.75" to --175--;

Column 33, Claim 1, Line 5, change "12.5" to --112.5--;

Column 34, Claim 10, Line 5, change "1.75" to --175--; and

Column 34, Claim 10, Line 12, change "12.5" to --112.5--.

Signed and Sealed this
Sixteenth Day of September, 2025

Coke Morgan Stewart
*Acting Director of the United States Patent and Trademark Office*